United States Patent [19]

Humbert, Jr.

[11] Patent Number: 4,846,223

[45] Date of Patent: Jul. 11, 1989

[54] SELF-VENTING SPOOL VALVE ASSEMBLY

[75] Inventor: Kingsley E. Humbert, Jr., Gastonia, N.C.

[73] Assignee: Dana Corporation, Toledo, Ohio

[21] Appl. No.: 272,173

[22] Filed: Nov. 16, 1988

[51] Int. Cl.4 .................... F16K 24/00; F16K 5/02
[52] U.S. Cl. ......................... 137/625.19; 137/588; 251/181; 251/309
[58] Field of Search .................... 137/588, 625.19; 251/181, 309, 904

[56] References Cited

U.S. PATENT DOCUMENTS

| | | | |
|---|---|---|---|
| 30,122 | 9/1860 | Cleveland | 251/181 |
| 232,312 | 9/1880 | Stevens | 137/588 |
| 779,946 | 1/1905 | Link | 137/588 |
| 2,113,046 | 4/1938 | Freemon | 137/588 X |
| 2,177,875 | 10/1939 | Norza | 137/588 |
| 3,481,367 | 12/1969 | Deuschle | 251/309 X |
| 3,788,599 | 1/1974 | Cloyd | 251/309 X |
| 3,985,152 | 10/1976 | Albanese | 251/309 X |

Primary Examiner—Gerald A. Michalsky
Attorney, Agent, or Firm—F. B. McDonald

[57] ABSTRACT

A self-venting spool valve assembly includes a novel mechanism for retention of a rotatable spool within a longitudinally disposed valve body. The spool contains first and second flanges at opposed ends thereof, wherein the first flange is adapted to bear against the longitudinal body of the valve assembly. The second flange, however, is spaced from the valve body by a groove, and a biasing retainer is disposed within the groove for frictional engagement between the second flange and the valve body in order to sealingly retain the spool within the valve body. In the preferred form, the spool and associated bore are tapered, and contain fluid drain and air vent apertures for selective communication with fluid drain and air vent passages extending through the longitudinal body of the valve assembly.

9 Claims, 2 Drawing Sheets

4,846,223

SELF-VENTING SPOOL VALVE ASSEMBLY

BACKGROUND OF THE INVENTION

This invention relates to self-venting spool valve assemblies of the type adapted to facilitate the draining of fluid from fuel filter sumps. More particularly, the invention relates to a mechanism for retaining a spool within a longitudinal valve body.

Most of the numerous prior art valve assemblies adapted for draining fluid, especially water, from sump or fuel filter apparatus of vehicles require special skills or instruction for use and adjustment, or are very bulky and expensive to fabricate. Moreover, many of the devices are not readily amenable to mass production. Thus, few are easily manufactured, and most require elaborate techniques for installation and use.

SUMMARY OF THE INVENTION

The self-venting spool valve assembly of the present invention provides a means by which both installation and use are less cumbersome than devices now available in the prior art. More specifically, the assembly employs simple construction, and is relatively inexpensive to manufacture. Moreover, utilization is elementary as compared to the operations of other available devices.

In a preferred form, the valve assembly incorporates a longitudinal body having a fluid drain passage, and an air vent passage which extends parallel to the fluid drain passage. A tapered transverse bore extends through the body to accommodate a rotatable valve spool mechanism which provides selective communication with fluid and air vent apertures extending through the valve spool. The spool contains first and second opposed flanges which are adapted for retention of the spool within the tapered transverse bore. One flange is located at each end of the rotatable spool, the first having a diameter greater than the greatest diameter of the tapered bore. The first flange is juxtaposed against the longitudinal valve body. The second flange has a diameter smaller than or equal to the smallest diameter of the tapered bore and is spaced from the body. The spool includes a groove adjacent the second flange; a snap ring is positioned within the groove and bears against the body between the second flange and the body. A biasing force is thereby directed along the axis of the spool to sealingly retain the spool within the valve body.

DETAILED DESCRIPTION OF THE PREFERRED EMBODIMENTS

Figure 1:
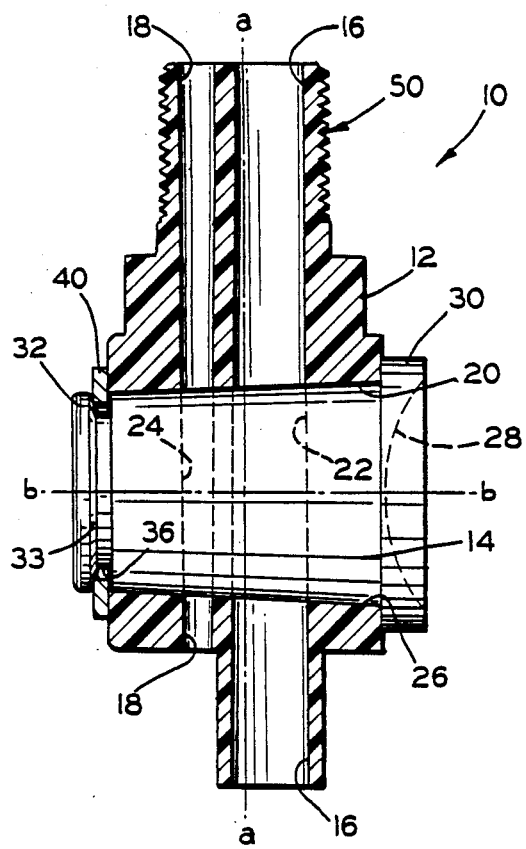
FIG. 1 is a cross-sectional elevation view of a first preferred embodiment of the spool valve assembly of the present invention.

Referring initially to FIG. 1, a spool valve assembly 10 has a longitudinal valve body 12 oriented along an axis "a—a". The assembly 10 incorporates a rotatable valve spool 14 which extends transversely through the body 12 within a tapered transverse bore 20 oriented along a cross-axis "b—b". The valve body 12 includes a fluid drain passage 16 oriented parallel to the axis "a—a". Parallel to the fluid drain passage 16 is a tapered air vent passage 18, of a smaller average diameter or cross section. Mating and communicating with respective fluid drain and air vent passages, 16 and 18, fluid and air apertures 22 and 24, respectively, extend through the valve spool 14.

Figure 6:
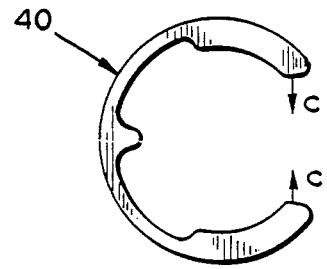
FIG. 6 in an elevation view of a snap ring utilized in the preferred embodiment of FIG. 1.
Figure 7:
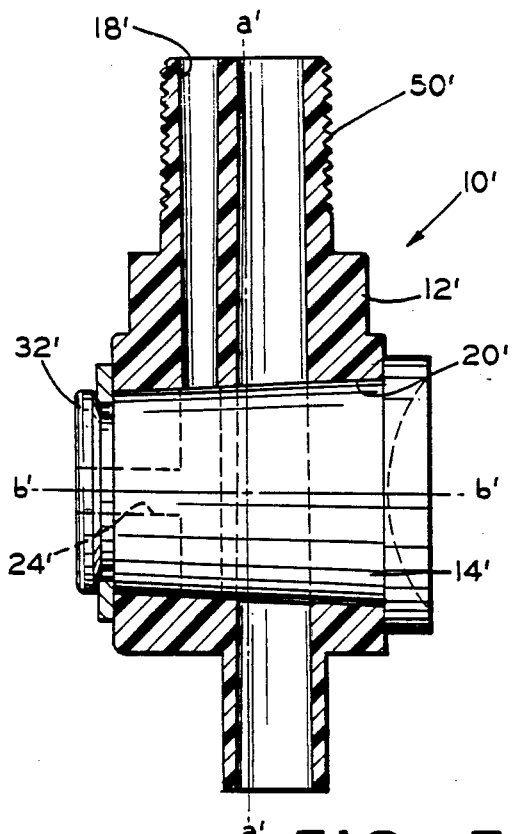
FIG. 7 is a cross-sectional elevation view of an alternate embodiment of the spool valve assembly of the present invention.
Figure 8:
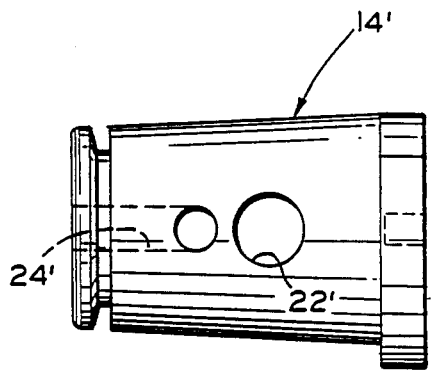
FIG. 8 is a side view of a modified valve spool as employed in the embodiment of FIG. 7.

The valve spool 14 includes a pair of flanges; specifically, first and second opposed flanges 30 and 32, at respective ends of the spool. The flanges 30 and 32 are adapted for retention of the spool 14 within the tapered bore 20 of the valve body 12. The first flange 30 is juxtaposed against, for direct engagement with, the valve body 12, while the second flange 32 has a diameter smaller than or equal to the smallest diameter end of the bore adjacent the flange 32. The flange 32 is spaced from the valve body and defines an abutting annular groove 36 adapted to receive a retainer 40, such as the snap ring as shown, for biasing the flange 32 away from the valve body 12 (See FIG. 6). The snap ring 40 bears against a radially oriented cam or wedge surface 33 on the inside surface of the flange 32, and thus axially biases the valve spool 14 resiliently but tightly within the valve body 12 for maintaining selective rotatable communication between the apertures 22 and 24 and respective passages 16 and 18. The snap ring 40 ideally will be slightly stressed when installed in place within the groove 36; preferably under a radially inwardly directed spring force (along lines "c—c" of FIG. 6). In combination with the surface 33, the ring 40 thus operates to provide a biasing force along the axis "b—b" of spool rotation, and is thus effective to positionally and sealingly retain the spool 14 in proper alignment within the tapered bore 20 of the valve body 12. The groove 40 should be deep enough to accommodate radial inward movement of the ring 40 along lines "c—c" as wear occurs during use.

It will be appreciated by those skilled in the art that the passages 16 and 18, the apertures 22 and 24, as well as the transverse bore 20 are all tapered, to the extent that each decreases or increases linearly in diameter as a function of distance from one end of either the valve body 12 or the valve spool 14. The tapers of the air and fluid passages facilitate the molding process for forming the body 12. It will therefore be appreciated that, in the preferred form, the respective tapers of the air and fluid passages will flare in opposite directions for convenience of utilizing the smallest relative space requirements. In this manner, the passages are "nested" together through the valve body, and the respective fluid and air apertures through the spool are similarly nested in a like manner for proper mating with their respective corresponding air and fluid passages.

Those skilled in the art will also appreciate that the second opposed flange 32 of the valve spool 14 will be smaller than or equal to the smallest diameter end of the tapered transverse bore 20 adjacent the flange 32. Thus, referring to FIG. 1, it will be noted that the valve spool is readily assembled into the valve body 12 by insertion leftwardly through the right hand end 26 of the bore 20. Upon contact of the first flange 30 with the valve body 12, the snap ring 40 is installed into the groove 36 to sealingly retain the rotatable spool 14 within the bore 20.

Figure 2:
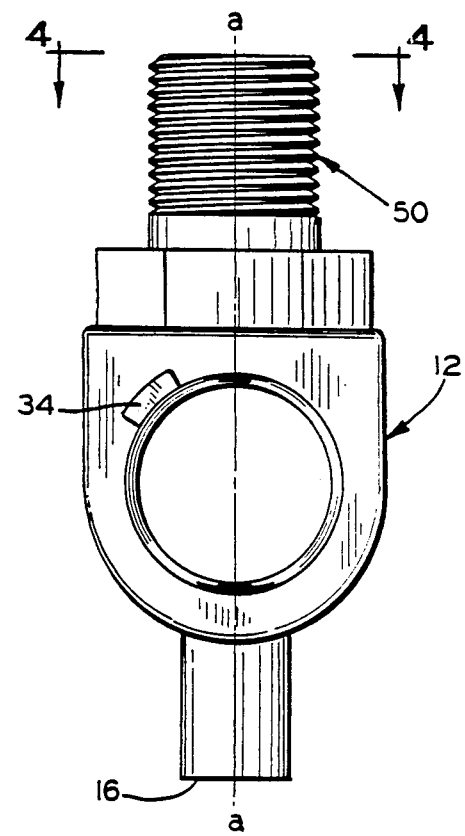
FIG. 2 is an elevation end view of a preferred embodiment of the valve body utilized in accordance with the present invention.
Figure 3:
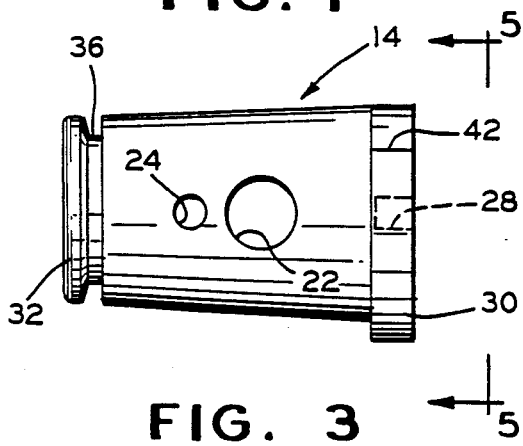
FIG. 3 is a side view of a valve spool utilized in the same preferred embodiment of the present invention.
Figure 4:
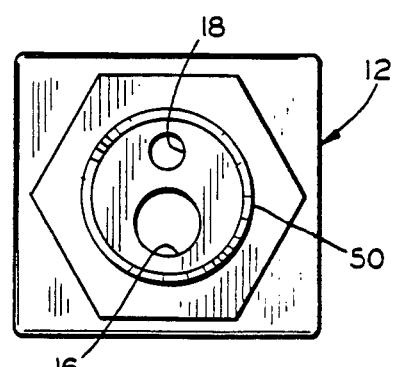
FIG. 4 is a top view of the valve body of FIG. 2, shown along lines 4—4 of FIG. 2.

Referring now to FIGS. 2, 3, and 4, individual components of body 12 and spool 14 are depicted separately. As noted in reference to FIGS. 2 and 4, the fluid drain and air vent passages 16 and 18 extend upwardly through an annular threaded portion 50 at the top of the valve body 12 for simple installation into a fluid sump in, for example, a vehicle.

In the preferred form of the present invention, the valve body 12 and the valve spool 14 rotatable therein are formed of different materials. In one preferred embodiment, the body 12 is formed of a hard plastic material such as an unfilled polyacetal. The valve spool 14 is formed of a thermo-plastic material such as a filled polyacetal with a 30 percent glass composition. The use of specifically different material compositions such as those identified will prevent galling or joining together of the components which may occur as the valve is subjected to substantial variations in temperature and weather conditions over a lengthy period of time without use.

Figure 5:
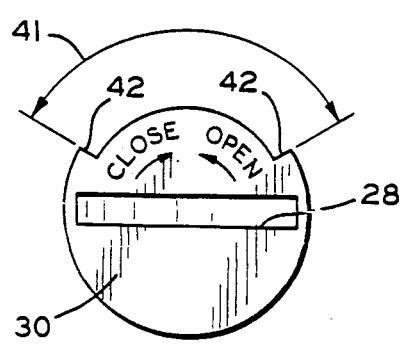
FIG. 5 is an end elevation view of the valve spool of FIG. 3, shown along lines 5—5 of FIG. 3.

Referring now to FIGS. 3 and 5, it will be noted that the first flange 30 of the valve spool 14 contains a concave slot positionally adapted for rotation of the valve spool over a 90 degree arc. A pair of detent stops or limits 42 are formed on the first flange 30 for the purpose of limiting the rotation between "closed" and "opened" positions. The angular distance 41 between the detent stops 42 is 120 degrees in order to accommodate a detent contact 34 on the valve body 12 (FIG. 2) having a thickness extending over an arc of 30 degrees. As a result, there will only be a 90 degree rotation of the spool, notwithstanding the 120 degree angular distance between the detent stops 42.

Although the passages 16 and 18 are tapered, each has a minimum diameter. A preferred range of the relative minimum diameters between fluid and air passages 16 and 18 is one that establishes a size relationship wherein the diameter of the fluid drain passage 16 is 4 to 10 times that of the air passage. Also, for the size ranges envisioned for accommodation in the present application, a 0.060 inch diameter is the preferred smallest minimum size of the air vent passage 18.

Referring now to FIGS. 7-10, two other alternative embodiments are shown which provide alternative air vent passageways. Thus, referring particularly to FIG. 7, it will be noted that while the fluid drain passage 16 remains similar to that of FIG. 1, the air vent passage 18' extends only through the annular threaded nipple portion 50' of the valve body 12' and down to the transverse bore 20'. The air vent passage 18 does not therefore continue below the valve spool 14 in the embodiment of FIG. 7. Instead, it will be appreciated that the air aperture 24' within the spool 14' exhausts along the axis "b'—b'" of the spool 14' and out through the second flange 32' of the latter spool.

Figure 9:
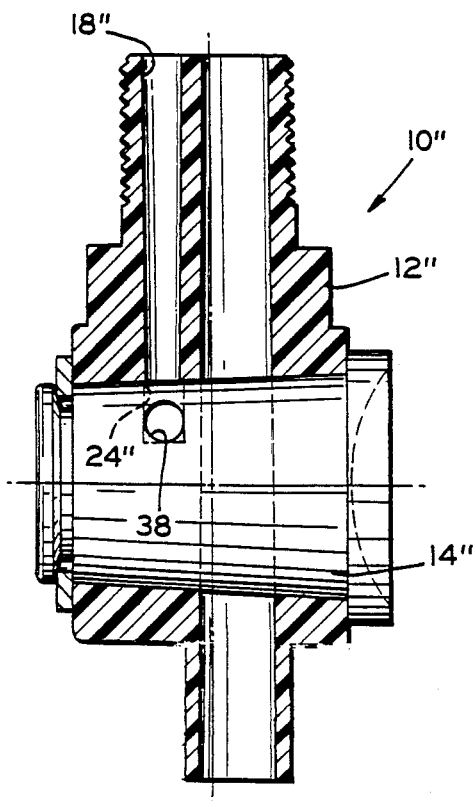
FIG. 9 is yet another preferred embodiment of the spool valve assembly of the present invention.
Figure 10:
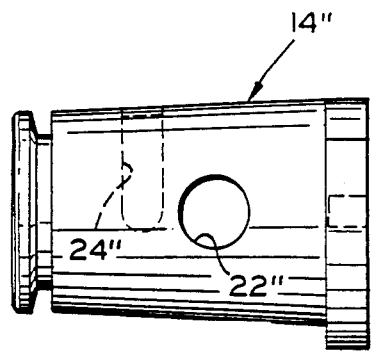
FIG. 10 is a side view of a modified valve spool as incorporated in the assembly of FIG. 9.

Referring now to FIG. 9, the spool valve assembly 10" shown therein contains a valve body 12" having an air vent passage 18" which extends vertically downwardly to the valve spool 14" but then exits horizontally out of the valve body 12" through a horizontal air vent 38 as shown. In this latter embodiment, the aperture utilized through the spool 14" for venting of the air passage 18" is a slot 24" which provides communication between the radially intersecting air vent passages 18" and 38 through the valve body 12".

Although only three preferred embodiments have been detailed and described herein, the following claims envision a number of other alternatives which fall within the spirit and scope thereof.

What is claimed is:

1. In a self-venting spool valve assembly having a body, said body defining a longitudinal axis and having a fluid drain passage extending generally parallel to said axis and an air vent passage also extending generally parallel to said axis, said body further defining a bore extending entirely through said body and transversely with respect to said longitudinal axis, said bore intersecting both said drain and vent passages, a spool rotatably mounted within said bore, said spool having an axis of rotation and including a drain aperture and a vent aperture spaced from said drain aperture, said apertures disposed for selective communication with respective drain and vent passages in said body; an improvement comprising: said spool having first and second opposed flanges adapted for retention of said spool within said bore of said body, one flange positioned at each end of said rotatable spool, said first flange having a diameter greater than the greatest diametric dimension of said bore and being juxtaposed against said body, said second flange having a diameter smaller than the smallest diameter of said bore and being spaced from said body, said spool further comprising an annular groove adjacent said second flange, said second flange comprising a wedge surface on said second flange adjacent said groove, said improvement further comprising biasing means positioned within said groove against said wedge surface and bearing against said body to hold said second flange away from said body, said biasing means providing a force directed along said axis of rotation of said spool, whereby said biasing means is effective to sealingly retain said spool within said body.

2. The self-venting spool valve assembly of claim 1 wherein said spool and bore have mating tapers, each taper having its smallest diameter at the second flange end of said spool.

3. The self-venting spool valve assembly of claim 2 wherein said body comprises a material different from the material of said spool.

4. The self-venting spool valve assembly of claim 3 wherein said axial means for biasing comprises a snap ring.

5. The self-venting spool valve assembly of claim 4 wherein said body comprises a material of unfilled polyacetal, and wherein said spool comprises a thermo-plastic material comprising a thirty-percent glass-filled polyacetal.

6. The self-venting spool valve assembly of claim 5 wherein said fluid drain and air vent passages comprise tapers extending reversely with respect to one another.

7. The self-venting spool valve assembly of claim 6 wherein said body further comprises a threaded nipple portion about one end thereof through which extend said fluid drain and air vent passages.

8. The self-venting spool valve assembly of claim 7 wherein said movement of said rotatably mounted spool within said bore is limited to ninety degrees of rotation within said bore, said rotation being limited by detent stops.

9. The self-venting spool valve assembly of claim 7 wherein said spool comprises a concave slot in said first flange thereof adapted for rotation of said spool within said bore.

* * * * *